United States Patent
Netsu et al.

(10) Patent No.: US 10,097,721 B2
(45) Date of Patent: Oct. 9, 2018

(54) SCANNER, AND IMAGE DATA GENERATING METHOD

(71) Applicant: SEIKO EPSON CORPORATION, Tokyo (JP)

(72) Inventors: Takahiro Netsu, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/689,231

(22) Filed: Aug. 29, 2017

(65) Prior Publication Data

US 2018/0063355 A1    Mar. 1, 2018

(30) Foreign Application Priority Data

Sep. 1, 2016   (JP) ................................ 2016-170563

(51) Int. Cl.
*H04N 1/04*    (2006.01)
*H04N 1/10*    (2006.01)
*H04N 1/393*   (2006.01)

(52) U.S. Cl.
CPC ......... *H04N 1/0432* (2013.01); *H04N 1/1043* (2013.01); *H04N 1/1052* (2013.01); *H04N 1/393* (2013.01)

(58) Field of Classification Search
CPC combination set(s) only.
See application file for complete search history.

(56) References Cited

U.S. PATENT DOCUMENTS

| 6,424,433 B1* | 7/2002 | Miyauchi | H04N 1/0402 358/471 |
| 6,603,581 B2* | 8/2003 | Lam | H04N 1/0402 358/474 |
| 6,831,262 B2* | 12/2004 | Nagashima | H04N 5/2176 250/204 |
| 7,014,113 B1* | 3/2006 | Powell | G06K 7/10683 235/454 |
| 8,345,325 B2 | 1/2013 | Schmidt et al. | |
| 8,605,144 B2* | 12/2013 | Takayama | H04N 5/3532 348/79 |
| 9,013,749 B2* | 4/2015 | Miyazaki | H04N 1/024 358/1.2 |
| 2009/0231598 A1* | 9/2009 | Kimura | G06T 3/4007 358/1.2 |

(Continued)

FOREIGN PATENT DOCUMENTS

| EP | 2091223 A1 | 8/2009 |
| JP | 4864021 B2 | 1/2012 |
| JP | 2013-131794 A | 7/2013 |

*Primary Examiner* — Dung D Tran

(57) ABSTRACT

A scanner reads a document using a sensor group and includes an optical member. When a scanning resolution in a main scanning direction is D, and a resolution of the sensor group is S, the optical member causes the sensor group to image light from the document magnified by a magnification ratio n, where n is greater than or equal to D/S and is greater than 1. The sensor group includes a plurality of sensor portions that are arrayed in L rows in a sub-scanning direction, and L is greater than or equal to n and is an integer of 3 or more. Each of the sensor portions reads a magnified image that is magnified by the magnification ratio n at each corresponding position in the main scanning direction of the document and that is guided by the optical member.

5 Claims, 11 Drawing Sheets

(56) References Cited

U.S. PATENT DOCUMENTS

2010/0073732 A1* 3/2010 Matsunaga ........ H04N 1/40068
                                                    358/447
2011/0038019 A1* 2/2011 Kawano ............... H04N 1/0306
                                                    358/475
2013/0155472 A1   6/2013 Kawano et al.

* cited by examiner

SCANNER, AND IMAGE DATA GENERATING METHOD

CROSS-REFERENCE TO RELATED APPLICATIONS

This application claims priority to Japanese Patent Application No. 2016-170563 filed on Sep. 1, 2016. The entire disclosure of Japanese Patent Application No. 2016-170563 is hereby incorporated herein by reference.

BACKGROUND

1. Technical Field

The present invention relates to a scanner, and a method used by a scanner to generate image data.

2. Related Art

Scanners that read a segment of a main scan line by means of a line sensor corresponding to that segment, and synthesize the image data of multiple segments read by multiple line sensors to generate an image of the complete main scan line, are known from the literature. See, for example, JP-A-2013-131794.

JP-A-2013-131794 describes a configuration having line sensors in two rows. JP-A-2013-131794 also states that the scan magnification may be greater than 1. However, a configuration for reading in the main scanning direction at a higher resolution than the resolution of the line sensor is not specifically described.

SUMMARY

An objective of the invention is to provide a scanner enabling scanning at a higher resolution in the main scanning direction than the resolution of the line sensor.

According to one aspect of the invention, a scanner reads a document using a sensor group and includes an optical member. When a scanning resolution in a main scanning direction is D, and a resolution of the sensor group is S, the optical member causes the sensor group to image light from the document magnified by a magnification ratio n, where n is greater than or equal to D/S and is greater than 1. The sensor group includes a plurality of sensor portions that are arrayed in L rows in a sub-scanning direction, and L is greater than or equal to n and is an integer of 3 or more. Each of the sensor portions reads a magnified image that is magnified by the magnification ratio n at each corresponding position in the main scanning direction of the document and that is guided by the optical member.

DESCRIPTION OF EMBODIMENTS

Figure 1:
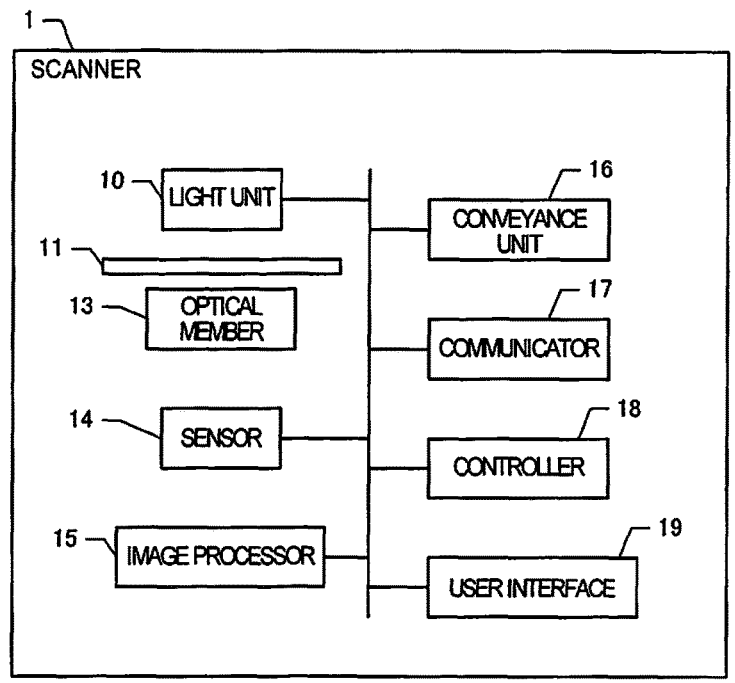
FIG. 1 is a block diagram of a scanner.

Preferred embodiments of the present invention are described below with reference to the accompanying figures. Note that like parts in the accompanying figures are identified by the same reference numerals, and redundant description thereof is omitted. Note also that the sensor chip may also be referred to as simply a line sensor below.

1. Embodiment 1

1-1. Scanner Configuration

FIG. 1 is a block diagram illustrating the configuration of a scanner 1 according to this embodiment of the invention. A scanner 1 according to this embodiment is configured as a film scanner, and includes a light unit 10, a scanning platen 11, an optical member 13, a sensor 14, an image processor 15, a conveyance unit 16, a communicator 17, a controller 18, and a user interface 19.

The controller 18 includes a processor which may be a CPU; an ASIC or other dedicated circuit device configured to execute specific processes. The CPU and ASIC, for example, may work together, and may be embodied by a single chip or multiple chips, ROM, and RAM. The controller 18 controls parts of the scanner 1 such as the light unit 10, the sensor 14, the image processor 15, the conveyance unit 16, the communicator 17, and user interface 19 by the CPU executing a control program stored in ROM and using RAM; and generates scanned image data read from a scanned document (film). The scanned image data may be used in many ways, stored to a recording medium, not shown, of the scanner 1, and provided to another device or recording medium connected to the scanner 1 through the communicator 17.

Note that instead of a CPU using RAM to execute the control program stored in ROM, an ASIC or other dedicated chip having function circuits configured to execute the processes may be provided, or an ASIC and CPU may work together to execute the programs.

The light unit 10 has a light source for illuminating the scanning area of the document (scan line). The sensor 14 includes multiple line sensors (described further below). Light emitted by the light source to the document (film) placed on the scanning platen 11 passes through the document and the scanning platen 11. An image of the scan line of the document is magnified by the optical member 13 in each segment of the scan line, and guided to the line sensor corresponding to each segment. Each segment partially overlaps an adjacent segment.

Each line sensor comprises multiple photoelectric conversion elements that output a signal corresponding to the intensity of light received by the line sensor, and each line sensor is embodied by a series of photoelectric conversion elements arrayed in the main scanning direction. Note that in this embodiment, the main scanning direction is perpendicular to the sub-scanning direction, which is the direction in which the document is conveyed. The optical member 13 includes multiple mirrors and an aperture.

The sensor 14 has an analog front end (AFE), not shown. The analog front end includes a circuit that applies gain to the signals output by the photoelectric conversion elements according to the amount of light received, and an analog/digital conversion (ADC) circuit.

The image processor 15 executes an imaging process of synthesizing image data from multiple line segments enlarged on the multiple line sensors based on the position of the segments in the main scanning direction and sub-scanning direction to generate image data representing an image of the document. The imaging process executed by the image processor 15 includes a shading correction process, skew correction process, and gamma correction process applied to the image data captured by the individual line sensors. The image processor 15 executes these imaging processes using a recording medium not shown of the scanner 1 as necessary.

The conveyance unit 16 includes a mechanism for conveying the document, and a driver. Illumination by the light unit 10 and reading by the sensor 14 are executed while the document is conveyed, and scanned image data is generated by the imaging process executed by the image processor 15. The communicator 17 has a communication interface circuit for communicating with external recording media and devices.

The user interface 19 includes an output unit that provides information to the user, and an input unit that receives input operations of the user. The output unit may include at least one of a display and a speaker (not shown). The input unit may include at least one of the display and a button (not shown). The controller 18, by executing a control program, displays on the output unit information for selecting scanning conditions and instructing scanning, for example. Based on output from the output unit, the user can select scanning conditions and input scanning commands. By executing the control program, the controller 18 controls parts of the scanner 1 according to the content input to the input unit.

1-2: Line Sensor and Optical Member Configuration

The scanner 1 according to this embodiment is configured to enable scanning to a maximum resolution of 4800 dpi (D) in the main scanning direction using a line sensor with a resolution of 1500 dpi (S). In other words, the scanner 1 enables high resolution scanning to a maximum resolution of approximately 3.2 times the optical resolution in the main scanning direction.

Figure 2:
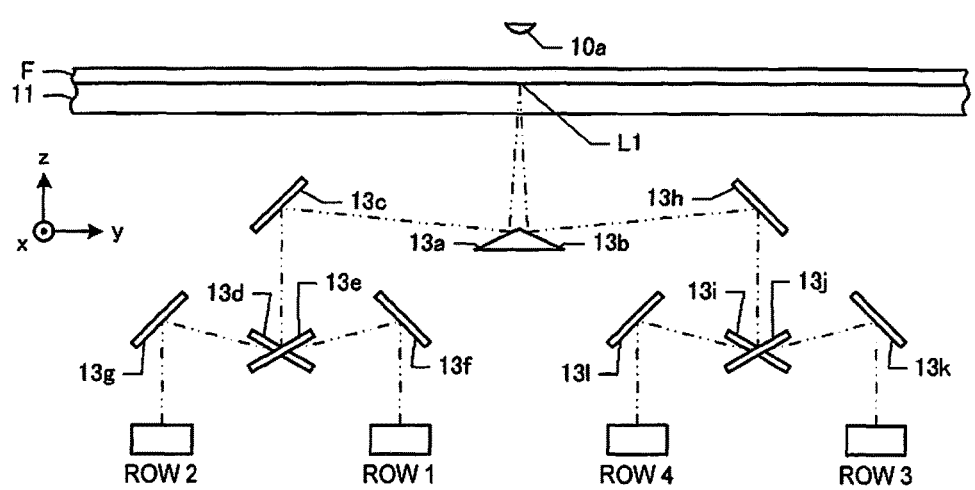
FIG. 2 schematically illustrates the configuration of optical members and a line sensor.
Figure 3:
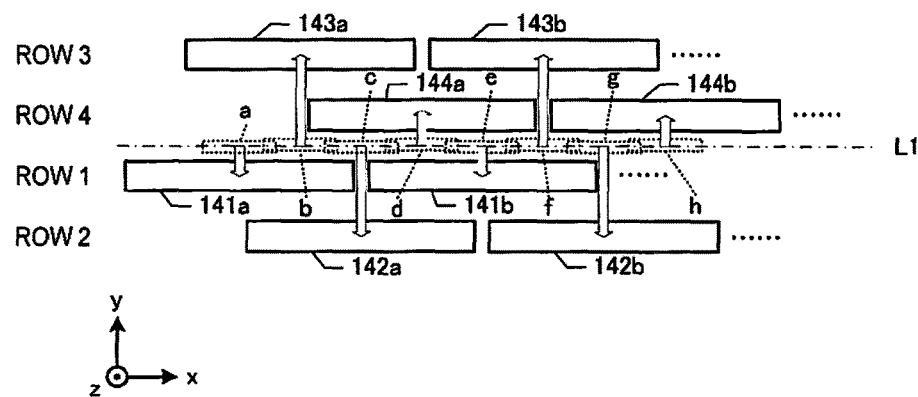
FIG. 3 illustrates line sensors corresponding to segments of a scan line.

FIG. 2 schematically illustrates the path of light between the line sensor and document F. The light path is indicated by the imaginary line in FIG. 2. FIG. 3 illustrates the relationship between segments a, b, c, d, e, f, g, h of scan line L1 of document F, and the arrangement of line sensors for each segment a, b, c, d, e, f, g, h. The scan line L1 is indicated by a dot-dash line, and the segment a, b, c, d, e, f, g, h is indicated by the dotted line. The arrows indicate the correlation between the line segments, and the line sensors that read the line segments. In the figures, the X-axis is parallel to the main scanning direction, the Y-axis is parallel to the sub-scanning direction, and the Z-axis is parallel to the thickness of the scanning platen 11.

As shown in FIG. 2 and FIG. 3, line sensors (sensor portions), which form a sensor group, are disposed in four rows in the sub-scanning direction. There are multiple line sensors in the main scanning direction in each row. As shown in FIG. 3, line sensors 141a, 141b, and so forth are disposed in the same row (first row, ROW1). Line sensors 142a, 142b are also disposed in the same row (second row, ROW2). Line sensors 143a, 143b are also disposed in the same row (third row, ROW3). Line sensors 144a, 144b are also disposed in the same row (fourth row, ROW4). The line sensors in each row are mutually offset in the X-axis direction.

Light source 10a emits light to the scan line L1. The multiple segments a, b, c, d, e, f, g, h shown on scan line L1 are the areas scanned by the corresponding line sensors. The segments a, b, c, d, e, f, g, h each overlap an adjacent segment. In one example, segment b overlaps one end of adjacent segment a, and segment b also overlaps one end of adjacent segment c.

Included in the optical member 13 includes mirrors 13a, 13b, 13c, 13d, 13e, 13f, 13g, 13h, 13i, 13j, 13k, 13l, and an aperture not shown. The Mirror 13a and the mirror 13b in this embodiment are plane mirrors. Light passing through the scan line L1 of the document F is guided by the mirror 13a and the mirror 13b in the negative and positive directions of the Y-axis (sub-scanning direction).

Light guided in the negative Y-axis direction by the mirror 13a is guided by the mirror 13c, the mirror 13d, and the mirror 13f to the line sensor associated with the first row. Light guided in the negative Y-axis direction by the mirror 13a is guided by the mirror 13c, the mirror 13e, and the mirror 13g to the line sensor associated with the second row. In this embodiment, the mirror 13c, the mirror 13f, and the mirror 13g are plane mirrors.

Light guided in the positive Y-axis direction by the mirror 13b is guided by the mirror 13h, the mirror 13i, and the mirror 13k to the line sensor for the third row. Light guided in the positive Y-axis direction by the mirror 13b is also guided by the mirror 13h, the mirror 13j, and the mirror 13l to the line sensor for the fourth row. In this embodiment, the mirror 13h, the mirror 13k, and the mirror 13l are plane mirrors.

Figure 4:
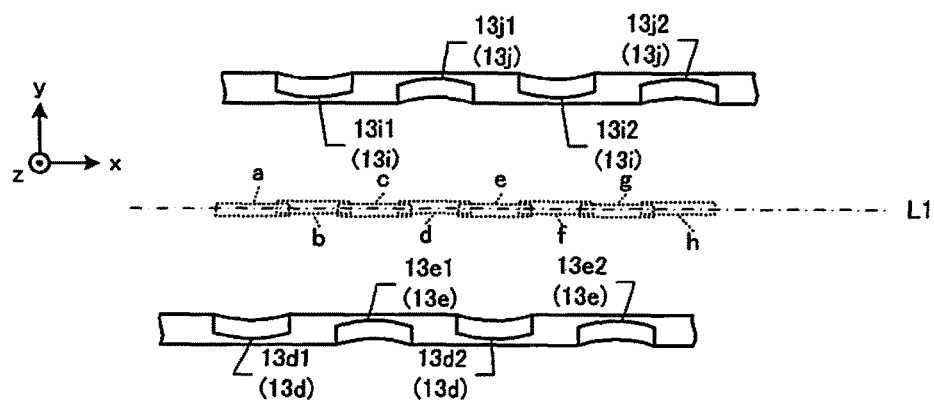
FIG. 4 illustrates mirrors corresponding to the segments of the scan line.
Figure 5:
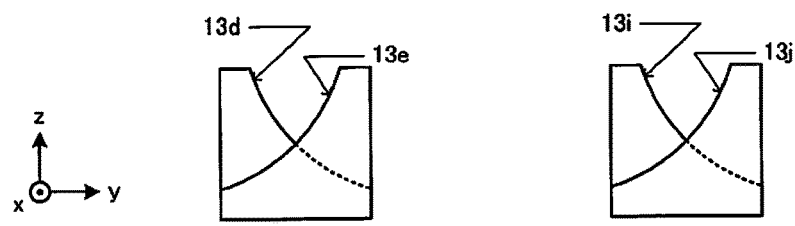
FIG. 5 shows the shape of mirrors.
Figure 6:
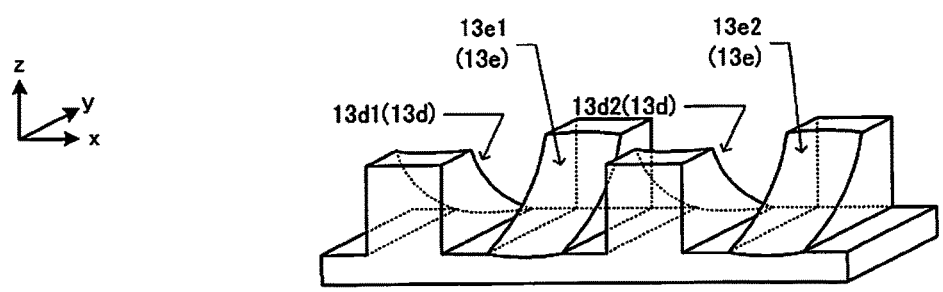
FIG. 6 is an oblique view of the shape of the mirrors.

FIG. 4 shows the relative positions of the mirrors 13d, 13e and the mirrors 13i, 13j as seen from the positive side to the negative side of the Z-axis. FIG. 5 shows the mirrors 13d, 13e and the mirrors 13i, 13j from the positive side to the negative side of the X-axis. FIG. 6 is an oblique view of the mirrors 13d, 13e. The mirror 13d generically refers to any one of multiple mirrors 13d1, 13d2, and so forth. Likewise, the mirror 13e generically refers to any one of multiple mirrors 13e1, 13e2, and so forth.

The mirror 13d and the mirror 13e are concave mirrors. The mirror 13d and the mirror 13e are alternately disposed. As shown in FIG. 6, the mirror 13d and the mirror 13e are disposed at alternating positions on the X-axis. The mirror 13d magnifies and guides in the positive Y-axis direction the segment of the image of the scan line L1 represented by the light incident from the mirror 13c. The mirror 13e magnifies and guides in the negative Y-axis direction the segment of the image of the scan line L1 imaged by the light incident from the mirror 13c. In this embodiment, to scan at a resolution of 4800 dpi in the main scanning direction using a line sensor with a resolution of 1500 dpi, the magnification ratio of the mirror 13d and the mirror 13e is approximately 3.2 times.

More specifically, the image of segment a on the scan line L1 shown in FIG. 3 and FIG. 4 is passed by the mirror 13a and the mirror 13c, magnified by the mirror 13d1, passed by the mirror 13f, and imaged by the line sensor 141a. The image of segment c on the scan line L1 is passed by the mirror 13a and mirror 13c, magnified by the mirror 13e1, passed by the mirror 13g, and imaged by the line sensor 142a. The image of segment e on the scan line L1 is likewise passed by the mirror 13a and the mirror 13c, magnified by the mirror 13d2, passed by the mirror 13f, and imaged by the line sensor 141b in the first row. The image of segment g on the scan line L1 is passed by the mirror 13a and the mirror 13c, magnified by the mirror 13e2, passed by the mirror 13g, and imaged by the line sensor 142b in the second row. The aperture may also be disposed to a suitable position in the light path, such as between the mirror 13d and the mirror 13f, or between the mirror 13e and the mirror 13g.

The mirrors 13i, 13j are disposed and shaped similarly to the mirrors 13d, 13e. However, the mirrors 13i, 13j are offset on the X-axis relative to the mirrors 13d, 13e so that light emitted to the area between the segment of the scan line L1 corresponding to the mirror 13d and the segment of the scan line L1 corresponding to the mirror 13e is incident.

More specifically, the image of segment b on the scan line L1 is reflected by the mirror 13b and the mirror 13h, magnified by the mirror 13i1, reflected by the mirror 13k, and imaged by the line sensor 143a on the third row. The image of segment d on the scan line L1 is reflected by the mirror 13b and the mirror 13h, magnified by the mirror 13j1, reflected by the mirror 13l, and imaged by line sensor 144a on the fourth row. The image of segment f on the scan line L1 is reflected by the mirror 13b and the mirror 13h, magnified by the mirror 13i2, reflected by the mirror 13k, and imaged by the line sensor 143b in the third row. The image of segment h on the scan line L1 is reflected by the mirror 13b, the mirror 13h, magnified by the mirror 13j2, reflected by the mirror 13l, and imaged by the line sensor 144b on the fourth row.

The magnification ratio of the concave mirror 13i and the mirror 13j is approximately 3.2 times, the same as the mirror 13d and the mirror 13e. Note that the aperture may be disposed to a desirable position on the light path (for example, between the mirror 13i and the mirror 13k, and between the mirror 13j and the mirror 13l).

1-3. Line Sensor Configuration

Figure 7:
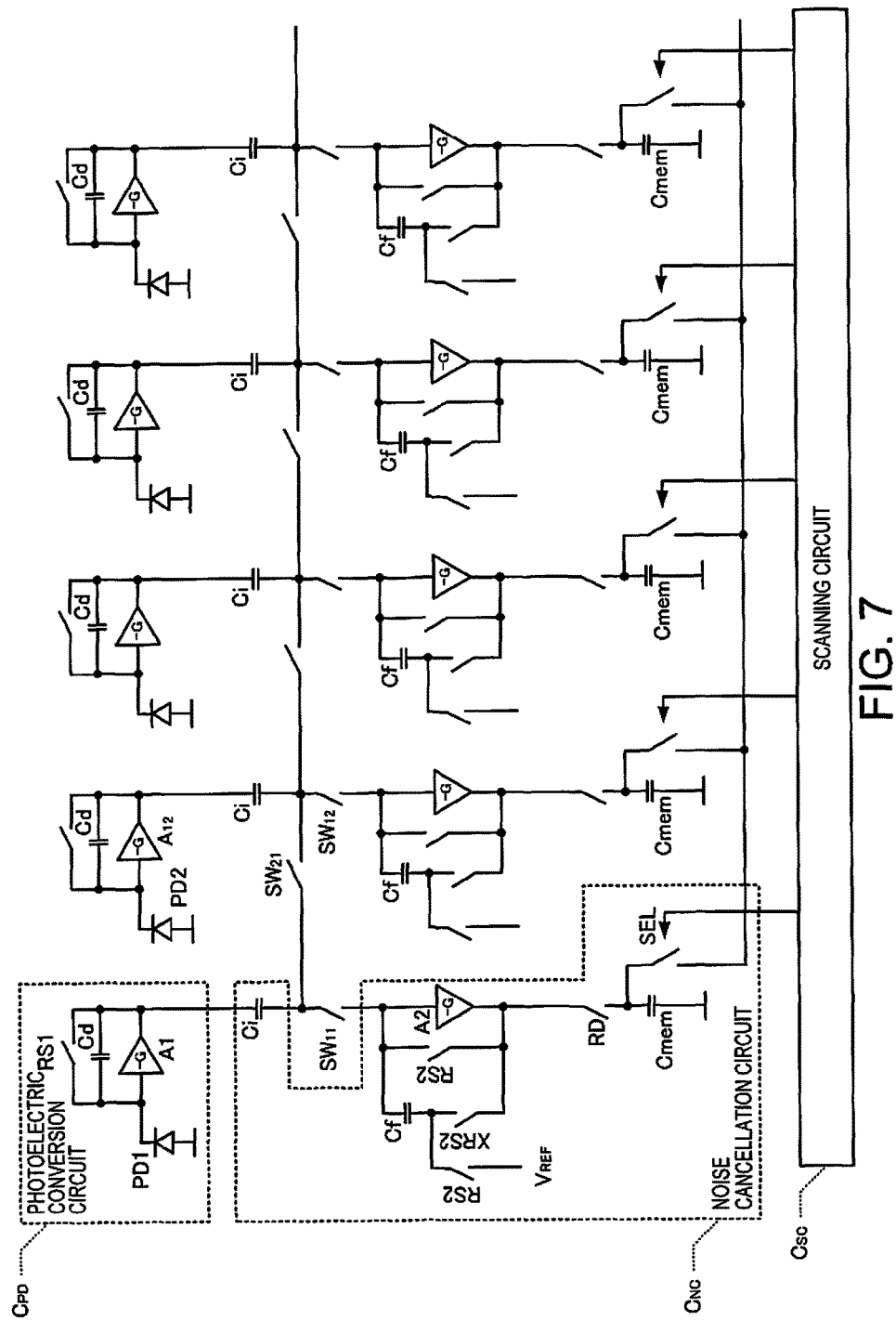
FIG. 7 shows an example of a line sensor circuit.

FIG. 7 shows the circuit configuration of the main part of the line sensor. The line sensor includes a photoelectric conversion circuit CPD comprising photoelectric conversion element PD1, a noise cancellation circuit CNC connected to the photoelectric conversion circuit CPD, and a scanning circuit CSC connected to the noise cancellation circuit CNC. The photoelectric conversion circuit CPD and the noise cancellation circuit CNC are provided for each of the multiple photoelectric conversion elements. The photoelectric conversion circuit CPD and the noise cancellation circuit CNC corresponding to one photoelectric conversion element PD1 are described with reference to FIG. 7, but the photoelectric conversion circuits CPD and the noise cancellation circuits CNC corresponding to the other photoelectric conversion elements PD1 are configured and operate the same. Note that only five photoelectric conversion circuits CPD and noise cancellation circuits CNC are shown in FIG. 7, but the photoelectric conversion circuit CPD, the noise cancellation circuit CNC, and switches repeat to the number of photoelectric conversion elements in the line sensor on the right side in FIG. 7, and the scanning circuit also extends accordingly.

The photoelectric conversion circuit CPD comprises a photoelectric conversion element PD1, an inverting amplifier A1, a capacitor Cd, and a reset switch RS1. The photoelectric conversion element PD1 in this embodiment is a photodiode with the anode to ground and the cathode connected to the input terminal of the inverting amplifier A1. The inverting amplifier A1 outputs the inverted output of the photoelectric conversion element PD1 amplified −G times. This output is a voltage appropriate to the amount of light received by the photoelectric conversion element PD1, and is denoted output voltage Vs below.

The capacitor Cd is connected to the output terminal and the input terminal of the inverting amplifier A1. More specifically, the capacitor Cd functions as a feedback capacitor disposed in a signal feedback path from the output terminal to the input terminal of the inverting amplifier A1. The reset switch RS1 is connected to the output terminal and the input terminal of the inverting amplifier A1. The output from the inverting amplifier A1 can therefore be reset by turning the reset switch RS1 on and shorting the capacitor Cd. In this embodiment, before scanning, a reset signal is output from a drive circuit not shown as controlled by the controller 18 to prepare for scanning by the reset signal turning the reset switch RS1 on.

The photoelectric conversion circuit CPD is connected to the noise cancellation circuit CNC. The noise cancellation circuit CNC includes a capacitor Ci, an inverting amplifier A2, a capacitor Cf, two reset switches RS2, and an inversion switch XRS2.

A first switch SW11 is connected to the input terminal of the inverting amplifier A2 and capacitor Ci. The inverting amplifier A2 outputs the inverted output of the photoelectric conversion element PD1 amplified −G times.

The Capacitor Cf and the inversion switch XRS2 are connected in series, one terminal of the capacitor Cf connected to the input terminal of the inverting amplifier A2, and one terminal of the inversion switch XRS2 connected to the output terminal of the inverting amplifier A2. One reset switch RS2 is connected between the capacitor Cf and the inversion switch XRS2, and reference voltage VREF is applied to the other side of the reset switch RS2. The other reset switch RS2 is connected to the output terminal and input terminal of the inverting amplifier A2.

In this embodiment, the signal controlling turning the inversion switch XRS2 on/off is the inverse of the signal controlling the on/off state of the reset switch RS2. Therefore, when the reset switch RS2 is on, the inversion switch XRS2 is off, and when the reset switch RS2 is off, the inversion switch XRS2 is on.

When the reset switch RS2 is off and the inversion switch XRS2 is on, the capacitor Cf functions as a feedback capacitance disposed in the signal feedback path from the output terminal to the input terminal of the inverting amplifier A2.

When the reset switch RS2 is on and the inversion switch XRS2 is off, the path between the input and output of the inverting amplifier A2 is shorted. In this case, the capacitor Cf is between a terminal of voltage Vt and the reference voltage VREF. In this case, if the input terminal of the inverting amplifier A2 is voltage Vt, a potential difference of Vt−VREF occurs between the ends of the capacitor Cf, and a charge corresponding to this potential difference is stored (reset).

This circuit cancels noise in the output voltage Vs of the photoelectric conversion circuit CPD by the capacitor Ci while inverting and amplifying the output voltage Vs by the inverting amplifier A2, and the noise cancellation circuit CNC therefore functions as a CDS (Correlated Double Sampling) circuit. When first switch SW11 is on and a second switch SW21 described below is off, the output voltage VCDS of the inverting amplifier A2 is VCDS=VREF−(CI/CF)*ΔVs, where CI is the capacitance of the capacitor Ci, CF is the capacitance of the capacitor Cf, and ΔVs is the change in the output voltage Vs of the inverting amplifier A1 during the exposure time of the photoelectric conversion element PD1.

The output terminal of the inverting amplifier A2 is connected to a read switch RD, and the other terminal of the read switch RD is connected to a capacitor Cmem and a selector switch SEL. The other terminal of capacitor Cmem goes to ground, and the selector switch SEL is connected to the output terminal of the line sensor.

The read switch RD turns on at the timing for reading the output of the photoelectric conversion element PD1, and when the read switch RD is on, a charge corresponding to the output voltage of the inverting amplifier A2 is stored in capacitor Cmem. When the read switch RD then turns off, and the selector switch SEL is turned on by the scanning circuit CSC, the charge in capacitor Cmem is read from the output terminal of the line sensor.

As described above, the photoelectric conversion circuit CPD and the noise cancellation circuit CNC are provided for each photoelectric conversion element PD1 of the line sensor. The noise cancellation circuits CNC are arranged in the order of the photoelectric conversion elements PD1.

The scanning circuit CSC has a signal bus for turning the selector switch SEL in each noise cancellation circuit CNC on/off. When the read switch RD turns on, as controlled by the controller 18, a charge can be stored in the capacitor Cmem corresponding to each photoelectric conversion element PD1; and when the read switch RD turns off, the scanning circuit CSC turns the selector switches SEL on one at a time in the order of the photoelectric conversion elements PD1 as controlled by the controller 18, and then turns the selector switches SEL off after a specific time. As a result, image data corresponding to the amount of light received by each photoelectric conversion element PD1 of the line sensor is output, and the outputs are acquired by the image processor 15.

In this example, the second switch SW21 is connected between the photoelectric conversion element PD1 and the first switch SW11. Note that in the example shown in FIG. 7 the second switch SW21 is connected between the capacitor Ci and the first switch SW11, but if the capacitor, amplifier, and wave-shaping circuits are ignored, the second switch SW21 may be seen as being connected between the photoelectric conversion element PD1 and the first switch SW11 (here and below).

As described above, the photoelectric conversion element PD1 and the second switch SW21 are connected through the capacitor Ci in this example, and the first switch SW11 and the second switch SW21 are connected directly without going through the capacitor Ci. This relationship is sufficient for the first switches and second switches corresponding to the multiple photoelectric conversion elements. This configuration also enables controlling the line through which the charge of the capacitor Ci flows by means of the first switch and second switch.

Because one first switch SW11 corresponds to one photoelectric conversion element PD1 in this embodiment, the photoelectric conversion element PD1 and the first switch SW11 may be thought of as a set. For example, if the photoelectric conversion element PD1 and the first switch SW11 shown in FIG. 7 are a set, then the adjacent photoelectric conversion element PD2 is part of a similar set comprising a photoelectric conversion element PD2 and a first switch SW12. The second switch SW21 is located between one set and the adjacent set, and is connected between the photoelectric conversion element PD and the first switch SW in each set. The second switch SW21 thus connects photoelectric conversion element and first switch pairs, and all second switches SW21 are connected in series.

The configuration described above enables the line sensors to synthesize the output of photoelectric conversion elements at desired adjacent positions. More specifically, the controller 18, by controlling a drive circuit not shown to control the switches of the line sensor, can select the photoelectric conversion elements to be synthesized, and select the capacitor Cmem to which the synthesized output is output. More specifically, when the second switch is off, the outputs of the photoelectric conversion elements are independent of each other because the pairs of photoelectric conversion elements and first switches are mutually independent. Furthermore, because each photoelectric conversion element is connected through a first switch to the scanning circuit CSC in this embodiment, whether or not the output of the photoelectric conversion element reaches the scanning circuit CSC can be controlled by controlling the on/off state of the first switch.

Therefore, to scan at a resolution S/n using a line sensor of resolution S, the controller 18 turns on the first switch corresponding to one of the photoelectric conversion elements to synthesize, and turns off the first switch corresponding to other photoelectric conversion elements. For example, if in the example in FIG. 7, n=2, that is, the output of two adjacent photoelectric conversion elements is merged, if first switch SW11 turns on and the first switch SW12 turns off, voltage is input to the noise cancellation circuit CNC corresponding to the photoelectric conversion element PD1, and voltage is not input to the noise cancellation circuit CNC corresponding to photoelectric conversion element PD2. As a result, the noise cancellation circuit CNC corresponding to photoelectric conversion element PD1 functions, and the noise cancellation circuit CNC corresponding to photoelectric conversion element PD2 does not function.

Because the second switch connects sets of the photoelectric conversion element and the first switch, when the second switch turns on, the output terminal of the photoelectric conversion circuit CPD of the adjacent set is energized. The controller 18 then turns on the second switch connecting the outputs of the photoelectric conversion elements to be synthesized, and turns off the second switches connecting the outputs of photoelectric conversion elements that are not synthesized. If only one of the specific first switches paired with the photoelectric conversion elements being synthesized turns on, the outputs of the photoelectric conversion circuit CPD corresponding to the photoelectric conversion elements to synthesize are combined, and can be processed by a specific noise cancellation circuit CNC (which cancels noise and outputs using the capacitor Cmem).

For example, if first switch SW11 is on, first switch SW12 is off, and second switch SW21 turns on, the outputs of photoelectric conversion element PD1 and PD2 are synthesized and processed by one noise cancellation circuit CNC. In this case, the output of one noise cancellation circuit CNC is VCDS=VREF−(CI/CF)*($\Delta$Vs1+$\Delta$Vs2), where CI is the capacitance of the capacitor Ci, CF is the capacitance of the capacitor Cf, $\Delta$Vs1 is the change in the output voltage Vs of the inverting amplifier A1 during the exposure time of the photoelectric conversion element PD1, and $\Delta$Vs2 is the change in the output voltage of the inverting amplifier A12 during the exposure time of the photoelectric conversion element PD2. Note that the capacitance of the capacitor Ci corresponding to the adjacent photoelectric conversion element is the same in all capacitors Ci, and the capacitance of the capacitor Cf is the same in all capacitors Cf.

The controller 18, using a drive circuit not shown, repeats control turning on the second switches connecting n sets adjacent to the elements to synthesize, turning off the other second switches, turning on one first switch corresponding to the n adjacent elements to synthesize, and turning off the other first switches, in n loops through the switches of each circuit corresponding to the photoelectric conversion elements arrayed in the main scanning direction. As a result, output of resolution S/n can be achieved.

Figure 8:
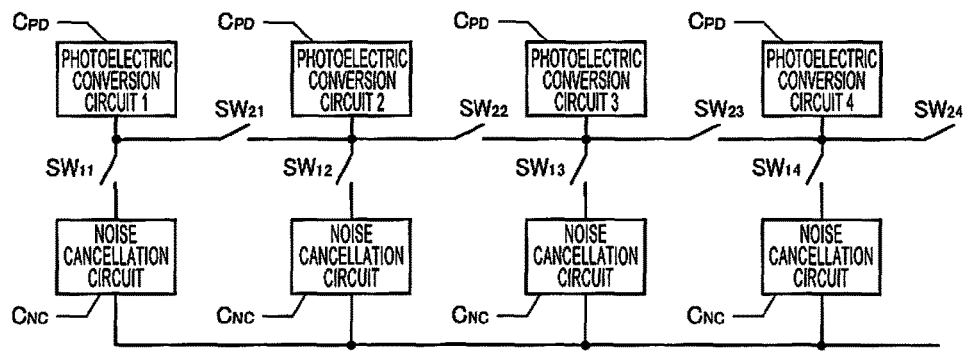
FIG. 8 illustrates switch control of image synthesis.

This method of control enables selecting the first of the n photoelectric conversion elements to merge from a desired position. More specifically, a line sensor according to this embodiment is configured so that photoelectric conversion element outputs can be synthesized and output in n loops from photoelectric conversion element m (where m is a value from 1 to n). FIG. 8 shows a simplified version of the circuit diagram in FIG. 7 focusing on the relationship between the circuits, the first switches, and the second switches, and a table illustrating the operation of the switches at different scanning resolutions. In the table in FIG. 8, the on/off cycle in the main scanning direction is indicated by the bold rectangles.

The photoelectric conversion elements of the line sensor with resolution S are disposed. As shown in the table in FIG. 8, to scan a document in cycles (sets) of one photoelectric conversion element from the first element of the line sensor, the controller 18, through a drive circuit, turns the first switch SW11 and second switch SW21 on and off, respectively, and repeats these switch settings in the main scanning direction. As a result, the output of each photoelectric conversion element in the photoelectric conversion circuit CPD is output without being merged with the output of another photoelectric conversion element (which may be interpreted as being merged in a cycle of 1 from the first element), and the document is scanned at resolution S.

As shown in line 2 in the table in FIG. 8, to scan a document in cycles of two photoelectric conversion elements from the first element of the line sensor, the controller 18, through a drive circuit, turns the first switch SW11, the second switch SW21, the first switch SW12, the second switch SW22 on, on, off, off, respectively, and repeats these switch settings in the main scanning direction. As a result, the outputs of the photoelectric conversion elements are merged and output in loops of two elements from the first photoelectric conversion element in the photoelectric conversion circuit CPD, and scanning is done at resolution S/2.

As shown in line 3 in the table in FIG. 8, to scan a document in cycles of three photoelectric conversion elements from the first element of the line sensor, the controller 18, through a drive circuit, turns the first switch SW11, the second switch SW21, the first switch SW12, the second switch SW22, the first switch SW13, the second switch SW23 on, on, off, on, off, off, respectively, and repeats these switch settings in the main scanning direction. As a result, the outputs of the photoelectric conversion elements are synthesized and output in a cycle of three elements from the first photoelectric conversion element in the photoelectric conversion circuit CPD, and scanning is done at resolution S/3.

As shown in line 4 in the table in FIG. 8, to scan a document in cycles of four photoelectric conversion elements from the first element of the line sensor, the controller 18, through a drive circuit, turns the first switch SW11, the second switch SW21, the first switch SW12, the second switch SW22, the first switch SW13, the second switch SW23, the first switch SW14, and the second switch SW24 on, on, off, on, off, on, off, off, respectively, and repeats these switch settings in the main scanning direction. As a result, the outputs of the photoelectric conversion elements are synthesized and output in a cycle of four elements from the first photoelectric conversion element in the photoelectric conversion circuit CPD, and scanning is done at resolution S/4.

When merging the output of photoelectric conversion elements in sets of a desired n elements, this embodiment also enables selecting the photoelectric conversion element to use as the starting point (element 1) in the cycle of n elements. For example, as shown in line 5 in the table in FIG. 8, the controller 18, through a drive circuit, turns the first switch SW11, the second switch SW21, the first switch SW12, the second switch SW22, the first switch SW13, and the second switch SW23 off, off, on, on, off, off, respectively, and except for the switches (first switch SW11, second switch SW21) corresponding to the first photoelectric conversion element, repeats setting the first switch SW12, the second switch SW22, the first switch SW13, and the second switch SW23 in the main scanning direction. As a result, the outputs of the photoelectric conversion elements are synthesized and output in a cycle of two elements from the second photoelectric conversion element in the photoelectric conversion circuit CPD, and scanning is done at resolution S/2.

Through a similar process, the controller 18 can synthesize the outputs of photoelectric conversion elements in groups of n elements starting from a desired element m, and output the synthesized results as the output of the line sensor. The controller 18 can therefore adjust the position of the n elements synthesized at the precision of one element of the line sensor.

By the line sensor configuration described above, this embodiment enables scanning at a high resolution of 4800 dpi, 2400 dpi (when n=2), 1600 dpi (when n=3) using a line sensor with a resolution S of 1500 dpi.

1-4. Scanning Process

Figure 9:
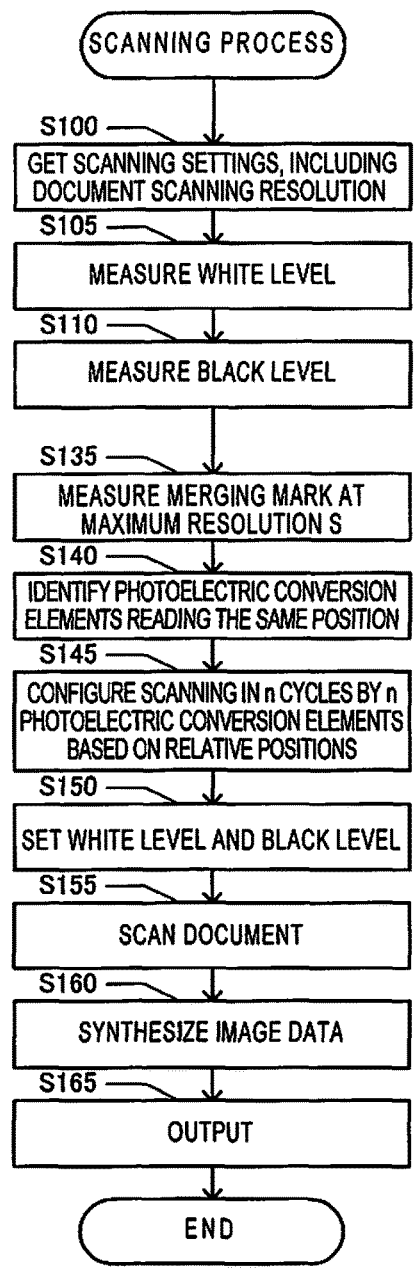
FIG. 9 is a flow chart of a scanning process.

Steps in the scanning process are described next with reference to the flow chart in FIG. 9. When the user directly or indirectly specifies the document scanning resolution through the user interface 19, the controller 18 receives the scan command and starts the scanning process shown in FIG. 9. When the scanning process starts, the controller 18 gets the scanning settings, including the document scanning resolution and the paper feed method (step S100). Note that in this example the user can select and set the desired resolution from among the plural document scanning resolutions that can be set.

Next, the controller 18 measures image shading. More specifically, the lowest level of light detectable by the line sensor is the black level, and the highest level of detectable light is the white level, but the black level and white level can vary according to the sensor, light source, and other characteristics. For example, sensor characteristics may vary due to noise such as dark current, sensor manufacturing errors, and aging, and the black level and white level can vary according to such variations. Therefore, to scan with high quality, imaging shading is preferably measured before reading a document to determine at least one of the black level and white level.

The controller 18 in this example first measures the white level (step S105). For example, before reading document F, the controller 18 turns the light source 10a on and reads by the line sensor before the document F reaches the scan line L1. The controller 18 acquires the output of the line sensor at this time as the white level.

Next, the controller 18 measures the black level (step S110). For example, before reading the document F, the controller 18 turns the light source 10a off and reads by the line sensor. The controller 18 acquires the output of the line sensor at this time as the black level.

Next, the controller 18 measures the merging mark using the resolution of the photoelectric conversion elements as the maximum resolution S (step S135). That is, before scanning the document, the controller 18 causes the line sensor to read a merging mark not shown. The controller 18 controls the switches so that the first switch SW11 and the second switch SW21 turn on and off, respectively, and repeats the switch setting at a cycle of one photoelectric conversion element at a time. As a result, the result of reading a merging mark unit not shown at resolution S is output from the multiple line sensors.

The merging mark unit can move in the sub-scanning direction between the light source 10a and the scanning platen 11. The merging mark unit may be disposed, for example, at a film holder that holds the document F. In this case, the merging mark unit is disposed to the film holder at a position that is read before the document F. Alternatively, the merging mark unit may be disposed movably in the sub-scanning direction between the light source 10a and the scanning platen 11 separately to the document F and the film holder. In this case, the merging mark unit is configured to move in step S135 to the position of the scan line L1, and otherwise retract from the position of the scan line L1. The merging mark formed on the merging mark unit is disposed at a common position that is read by different line sensors, and is disposed in line with the line sensors (main scanning direction) so that it is read by the end of each line sensor. In this example, the merging mark is a line extending in the sub-scanning direction, and the merging mark unit is transparent except where the merging mark is present.

Figure 10:
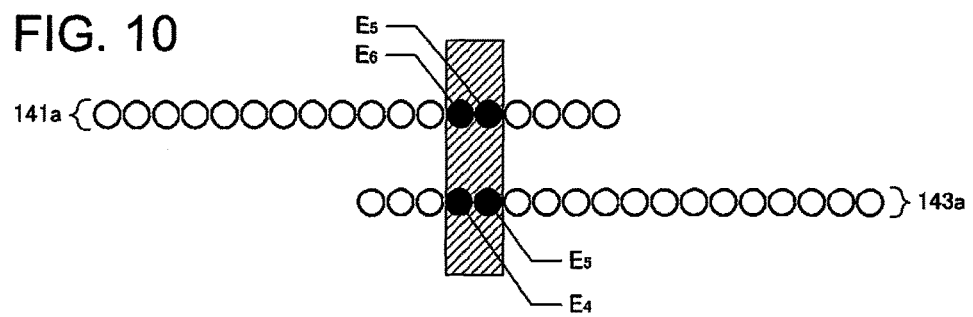
FIG. 10 illustrates image synthesis at the highest resolution.

Next, the image processor 15 identifies the photoelectric conversion elements that read the same position (step S140). FIG. 10 schematically illustrates the photoelectric conversion elements of the line sensor 141a, the line sensor 143a, and the black dots denoting photoelectric conversion elements. For example, using the example in FIG. 10, the image processor 15 identifies photoelectric conversion elements E5, E6 of the line sensor 141a, and photoelectric conversion elements E4, E5 of the line sensor 143a, as photoelectric conversion elements that read the same position. The image processor 15 executes the same process for each line sensor, and identifies the photoelectric conversion elements that read the same position in each line sensor.

Next, the controller 18 prepares to scan in groups of n using the n photoelectric conversion elements corresponding to the relative positions (step S145). More specifically, the controller 18 configures operation of the first switch and the second switch to synthesize the outputs of the photoelectric conversion elements identified in step S140 as the output of the same pixel, and synthesize the outputs in groups of n including the photoelectric conversion elements identified as reading the same position. The line sensor according to this embodiment enables selecting the location of the n photoelectric conversion elements to synthesize from the desired position.

Figure 11:
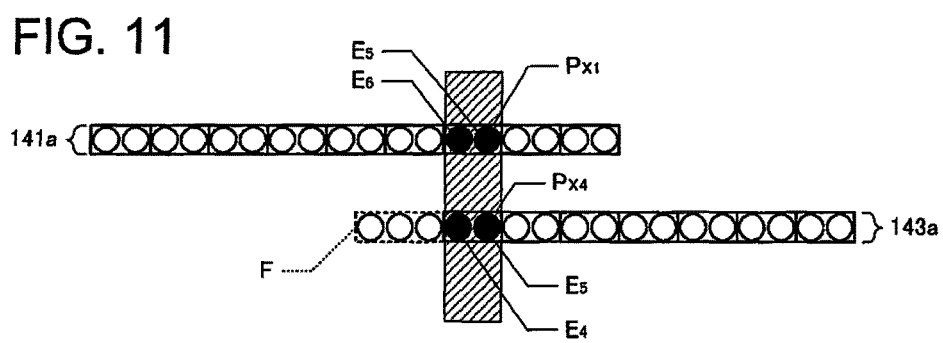
FIG. 11 illustrates image synthesis at resolution lower than the highest resolution.
Figure 12:
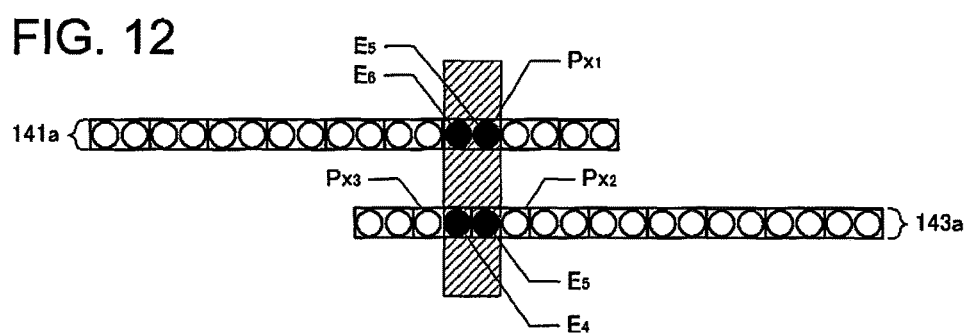
FIG. 12 illustrates image synthesis at resolution lower than the highest resolution.
Figure 13:
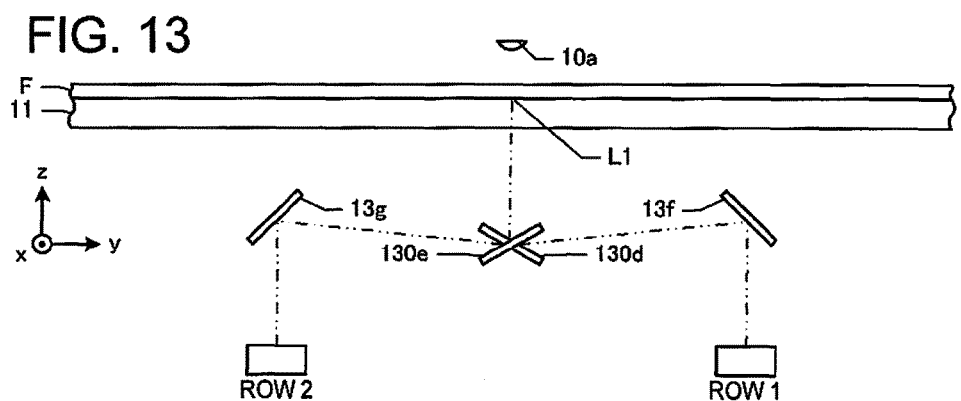
FIG. 13 schematically illustrates a comparative configuration of optical members and a line sensor.
Figure 14:
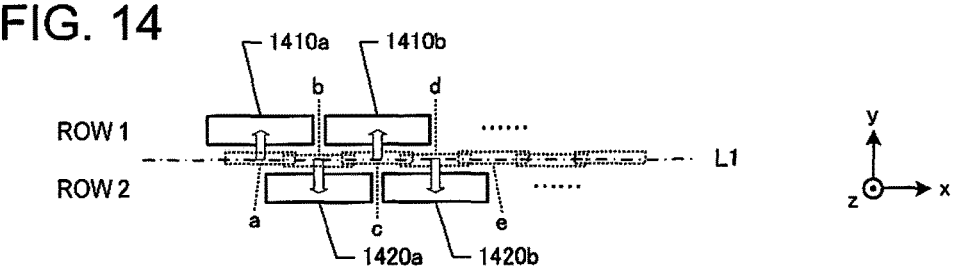
FIG. 14 schematically illustrates a comparative configuration of line segments and line sensors.
Figure 15:
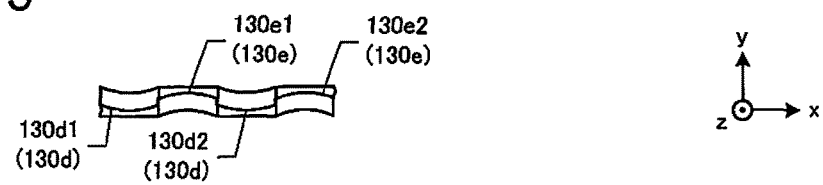
FIG. 15 schematically illustrates a comparative configuration of mirrors.
Figure 16:
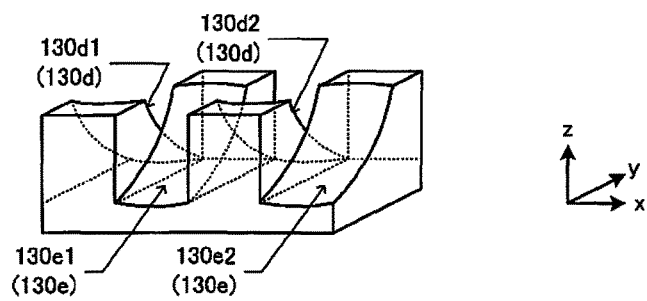
FIG. 16 is an oblique view of a comparative configuration of the mirrors.

For example, the example in FIG. 11 describes scanning when n=2. In the example in FIG. 11, the controller 18 controls the first switch and the second switch to synthesize the outputs in sets of 2 starting from the photoelectric conversion element E4 fourth from the end of line sensor 143a. As a result, in line sensor 143a, the outputs of the photoelectric conversion elements can be synthesized in sets as indicated by the solid line rectangles in FIG. 11, and the synthesized result can be output with the results of reading the merging mark being synthesized into a single pixel Px4. Even if, as shown in FIG. 12, the outputs are synthesized in groups of two elements from the end of the line sensor 143a, the merging mark will be contained in pixel Px2 and pixel Px3, and the output of line sensor 141a and the output of line sensor 143a cannot be correctly synthesized. However, because this embodiment enables selecting the position of the n photoelectric conversion elements to be synthesized as desired, the outputs can be correctly synthesized as described with reference to FIG. 11. Note that if n=1, step S145 is effectively skipped.

Various methods may be used to synthesize outputs. For example, assuming the output ai (here and below, the output after processing by shading correction, for example) of the photoelectric conversion element of the line sensor 141a at position i (where i is a natural number from 1 to n), and the output bi of the photoelectric conversion element at position i of the line sensor 143a, are the outputs of photoelectric conversion elements for the same position, the synthesized pixel value $g_i$ for position i can be defined as $g_i=j_i a_i+k_i b_i$ where $j_i$ and $k_i$ are coefficients of $0<=1$, and the sum thereof is 1.

These coefficients may be constants, such as 0.5, regardless of position i, or may vary according to position i, such as coefficients closer to the center of the line sensor being greater than the coefficients farther from the center.

Next, the controller 18 sets the black level and the white level (step S150). That is, the controller 18, based on the white level measured in step S105 and the black level measured in step S110, sets the white level and the black level for each photoelectric conversion element. More specifically, based on the white level measured in step S105 and the black level measured in step S110, the controller 18 sets the gain to enable measuring gradations between the white level and the black level in the actual detection range.

Next, the controller 18 scans the document (step S155). More specifically, the controller 18 outputs a control signal to the conveyance unit 16 to convey the conveyed document through the conveyance path, and controls the line sensors to execute specific steps, including a reset, and scan the document. As a result, the read results from each line sensor are sequentially output.

Next, the image processor 15 merges the outputs read in step S155 (step S160). More specifically, for each line, the image processor 15 executes the process of generating image data for one line from the output after processes such as shading correction of the photoelectric conversion elements based on the positions identified in step S140, and by repeating generating image data for a specified number of lines, generates image data representing the result of reading the conveyed document. Next, the controller 18 outputs the image data (step S165). More specifically, the controller 18 outputs the image data through the communicator 70 to an external device.

As described above, this embodiment can scan at a higher resolution D in the main scanning direction than the resolution S of the line sensors by using a configuration having line sensors disposed over multiple lines, magnifying by optical members the segments of the scan line L1 read by each line sensor, then combining the image data captured by each line sensor, and thereby acquiring magnified image data for the scan line L1. Even when the line sensor is disposed in one line (all line sensors are disposed on the same line parallel to the X-axis), the size of the area on the X-axis where the line sensor is disposed increases according to the magnification ratio. However, when configured as in this embodiment with the line sensor divided across plural lines according to the magnification ratio, high resolution scanning is possible without increasing the size of the area on the X-axis where the line sensor is disposed.

This embodiment describes an example that reads an image magnified approximately 3.2 times (magnification ratio n) by line sensors disposed in four rows (L rows), but the number of rows L in which the line sensors are disposed may be any integer greater than or equal to magnification ratio n. If the number of rows L is a smaller integer, the size of the area on the X-axis where the line sensor is disposed to form an image magnified n times is greater than when the number of rows L is an integer of magnification n or more, and the number of rows L is therefore preferably an integer of magnification n or more. Note that to avoid unnecessarily increasing the size of the area on the Y-axis where the line sensors are disposed, the number of rows L is preferably the smallest possible integer that is greater than or equal to magnification n.

Note that as shown in FIG. 4 and FIG. 6, the mirror 13*d*1 (first element), which is a part of the optical member for guiding light from segment a (first segment) on the scan line L1 to the line sensor 141*a* of the first row, and the mirror 13*e*1 (second element), which is a part of the optical member for guiding light from the segment c (second segment), which is a segment of the scan line L1 and is separated on the X-axis from the segment a, are separated on the X-axis.

The mirror 13*i*1 (third element), which is a part of the optical member for guiding light from the segment b (third segment), which is in the segments of the scan line L1 and includes the area between the segment a and the segment c, to the line sensor 143*a* in the third row is disposed separated from the mirror 13*d*1 and the mirror 13*e*1 on the Y-axis instead of being sandwiched between the mirror 13*d*1 and the mirror 13*e*1.

If the third element is disposed sandwiched between the first element and the second element, part of the light path may interfere with adjacent optical members. More specifically, FIG. 13, FIG. 14, FIG. 15, and FIG. 16 illustrate the arrangement of optical members and line sensors in a configuration for comparison with the foregoing embodiment.

In this comparison, the image of segment a is magnified by the mirror 130*d*1, reflected by the mirror 13*f*, and guided to line sensor 1410*a*. The image of segment c is magnified by the mirror 130*d*2, reflected by the mirror 13*f*, and guided to line sensor 1410*b*. The image of segment b including the area between the segment a and the segment c is magnified by the mirror 130*e*1, reflected by the mirror 13*g*, and guided to line sensor 1420*a*.

When magnifying the mirrors 130*d*1, 130*e*1, 130*d*2 are disposed adjacent as in the comparison, the support portion of one mirror may interfere with part of the light path of an adjacent mirror. To avoid this, this embodiment enlarges segments separated on the X-axis by mirrors separated on the X-axis, and enlarges segments adjacent on the X-axis by mirrors separated on the Y-axis. In this embodiment, therefore, the line sensor 141*a* of the first row that images a magnified image of the segment a (first segment), and the line sensor 142*a* of the second row that images a magnified image of the segment c (second segment) are disposed without disposing the line sensor 143*a* of the third row that images a magnified image of the segment b (third segment) including the area between the segment a and the segment c.

Note that the configuration of the optical members in this embodiment is one example only, and the optical members may be configured in any way enabling forming document images magnified a specific ratio on line sensors disposed in multiple rows.

2. Embodiment 2

Figure 17:
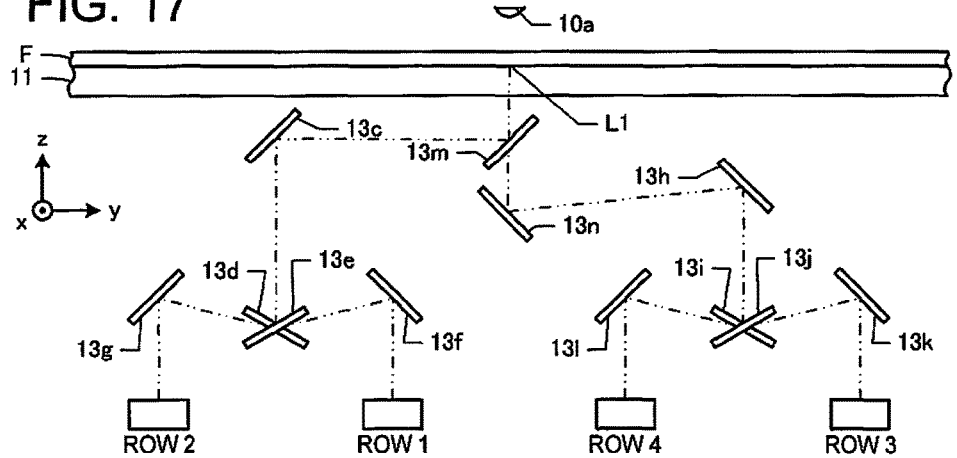
FIG. 17 schematically illustrates the configuration of optical members and a line sensor.

FIG. 17 schematically illustrates the line sensor arrangement and path of light (indicated by the imaginary line in the figure) reflecting the document F in a second embodiment of the invention. This embodiment differs from the first embodiment in that the light reflecting a scan line L1 is first split to the positive Y-axis side and the negative Y-axis side. As shown in FIG. 17, a half mirror 13*m* guides light from the scan line L1 to the negative Y-axis side, and light passing through the half mirror 13*m* is guided by a mirror 13*n* to the positive Y-axis side.

3. Embodiment 3

Figure 18:
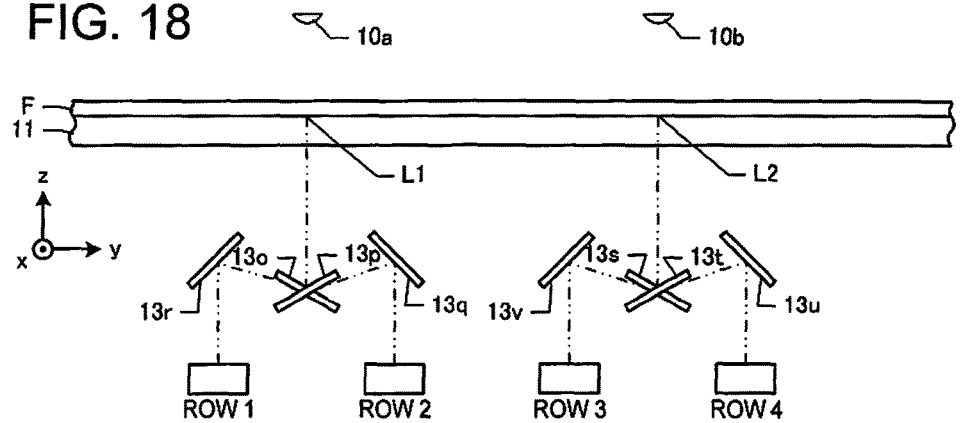
FIG. 18 schematically illustrates the configuration of optical members and a line sensor.
Figure 19:
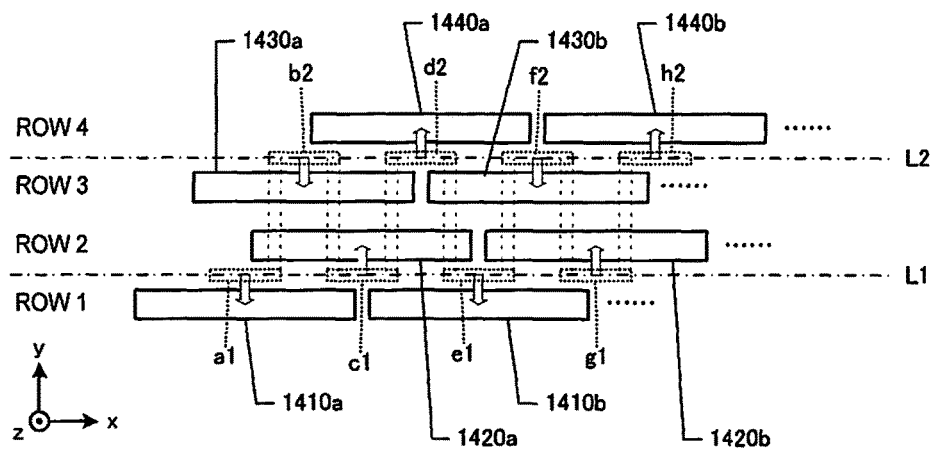
FIG. 19 schematically illustrates segments of a scan line and the corresponding line sensors.
Figure 20:
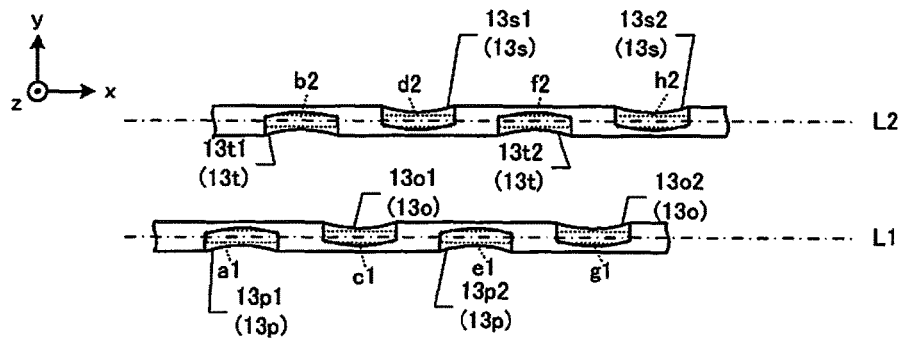
FIG. 20 schematically illustrates the segment of the scan line and the corresponding mirrors.

FIG. controller 18 to FIG. 20 schematically illustrate a third embodiment of the invention. FIG. 18 schematically illustrates the line sensor configuration and path of light (indicated by the imaginary line in the figure) reflected by the document F. FIG. 19 schematically illustrates segments on a scan line L1, segments on a scan line L2, and the arrangement of the line sensors corresponding to each segment. In FIG. 19 and FIG. 20, the scan lines L1, L2 are represented by a dot-dash line, and the segments by dotted lines. The double-dot dash line in FIG. 19 indicates where the end of one segment overlaps the end of another segment and a position in the main scanning direction. The scan line L1 and the scan line L2 are separated on the Y-axis.

In the third embodiment, reading images of the scan line L1 and the scan line L2 at the same time repeats synchronized to conveyance of the document F. The positions of the segment read on the scan line L1, and the segment read on the scan line L2, are offset on the X-axis. The image of a desired main scan line of the document F is generated by synthesizing the image of the segment read when the desired main scan line of the document F is at the scan line L1, and the image of the segment read when the desired main scan line of the document F is at scan line L2. This is described in detail below.

The light source 10a emits light to the scan line L1, and the light from the scan line L1 of the document F is passed by mirror 13p and mirror 13r to the line sensor associated with the first row. Light from the scan line L1 of the document F is also passed by mirror 13o and mirror 13q and guided to the line sensor for the second row.

Light source 10b emits light to the scan line L2, and the light from the scan line L2 of the document F is passed by mirror 13t and mirror 13v to the line sensor associated with the third row. Light from scan line L2 of the document F is also passed by mirror 13s and mirror 13u and guided to the line sensor for the fourth row.

In this embodiment, the mirror 13q, the mirror 13r, the mirror 13u, and the mirror 13v are plane mirrors.

FIG. 20 illustrates the relative positions of the mirrors 13o, 13p and the mirrors 13s, 13t as seen from the positive side to the negative side on the Z-axis. The mirrors 13o, 13p, and the mirrors 13s, 13t are shaped identically to the mirrors 13d, 13e shown in FIG. 5 and FIG. 6 according to the first embodiment. More specifically, the mirrors 13o, 13p and the mirrors 13s, 13t are concave mirrors. The mirror 13o denotes a desired mirror in the group of multiple mirrors 13o1, 13o2 and so forth. The mirror 13p denotes a desired mirror in the group of multiple mirrors 13p1, 13p2, and so forth. The mirror 13s denotes a desired mirror in the group of multiple mirrors 13s1, 13s2, and so forth. The mirror 13t denotes a desired mirror in the group of multiple mirrors 13t1, 13t2, and so forth. The mirror 13o and mirror 13p are alternately disposed. The mirror 13o and mirror 13p, like the mirror 13d and the mirror 13e shown in FIG. 6, are mutually separated on the X-axis. The mirror 13s and the mirror 13t are likewise mutually separated on the X-axis.

The mirror 13o magnifies and guides the image of a segment on the scan line L1 in the positive Y-axis direction. The mirror 13p magnifies and guides the image of a segment on the scan line L1 in the negative Y-axis direction. The mirror 13s magnifies and guides the image of a segment on scan line L2 in the positive Y-axis direction. The mirror 13t magnifies and guides the image of a segment on the scan line L2 in the negative Y-axis direction.

The magnification ratio of the mirror 13o, the mirror 13p, the mirror 13s, and the mirror 13t is also approximately 3.2. times in this embodiment to enable scanning at a resolution of 4800 dpi in the main scanning direction using line sensors with a resolution of 1500 dpi.

More specifically, the image of segment a1 on the scan line L1 shown in FIG. 19 and FIG. 20 is magnified by mirror 13p1, reflected by mirror 13r, and imaged by the line sensor 1410a of the first row. The image of segment c1 on the scan line L1 is magnified by mirror 13o1, reflected by mirror 13q, and imaged by the line sensor 1420a of the second row. The image of segment e1 on the scan line L1 is magnified by mirror 13p2, reflected by mirror 13r, and imaged by the line sensor 1410b of the first row. The image of segment g1 on the scan line L1 is magnified by mirror 13o2, reflected by mirror 13q, and imaged by the line sensor 1420b of the second row.

The image of segment b2 on the scan line L2 is magnified by mirror 13t1, reflected by mirror 13v, and imaged by the line sensor 1430a of the third row. The image of segment d2 on the scan line L2 is magnified by mirror 13s1, reflected by mirror 13u, and imaged by the line sensor 1440a of the fourth row. The image of segment f2 on the scan line L2 is magnified by mirror 13t2, reflected by mirror 13v, and imaged by the line sensor 1430b of the third row. The image of segment h2 on the scan line L2 is magnified by mirror 13s2, reflected by mirror 13u, and imaged by the line sensor 1440b of the fourth row.

The scan line L2 is designed to be at a position separated from the scan line L1, and the integer number of scan lines determines the scanning resolution on the Y-axis (sub-scanning direction). As a result, an image of the same main scan line of the document F can be generated using images captured at different times.

More specifically, by the image processor 15 combining (synthesizing), appropriately to the position in the main scanning direction, image data (data after processing for shading correction, for example) representing a magnified image of the segments a1, c1, e1, g1 read from the scan line L1 at the timing when the line of a desired position on the document F is at the scan line L1, and image data (data after processing for shading correction, for example) representing a magnified image of the segments b2, d2, f2, h2 read from the scan line L2 at the timing when the line of a desired position on the document F positioned at the scan line L2 by conveying the document F, image data for a magnified image of a desired line on the document F can be generated.

Image data in two dimensions representing the document F can be generated by likewise processing all lines in the document F appropriately to the scanning resolution in the sub-scanning direction.

4. Other Embodiments

The scope of the present invention is not limited to the foregoing embodiments, and can be varied in many ways without departing from the scope of the invention as described in the accompanying claims.

Figure 21:
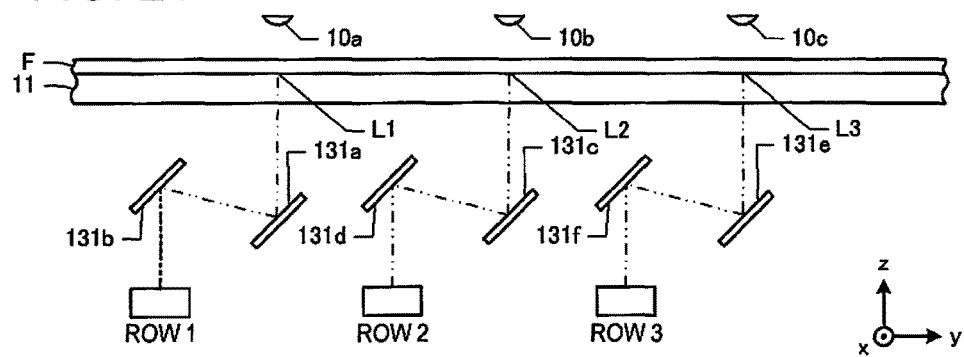
FIG. 21 schematically illustrates the configuration of optical members and a line sensor.
Figure 22:
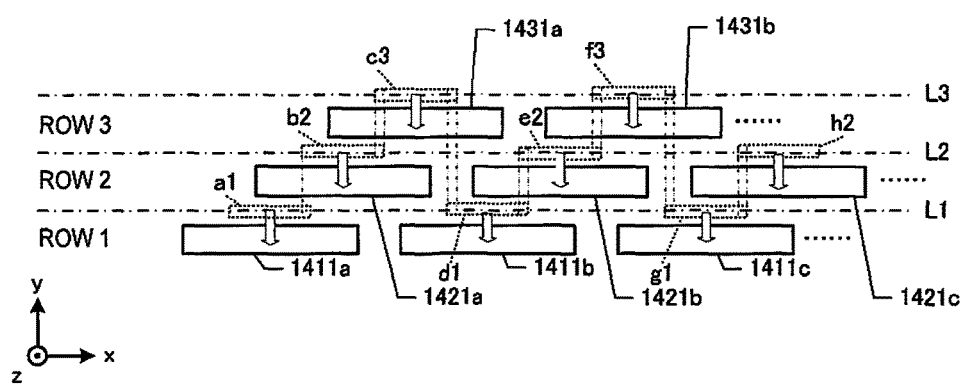
FIG. 22 schematically illustrates segments of a scan line and the corresponding line sensors.
Figure 23:
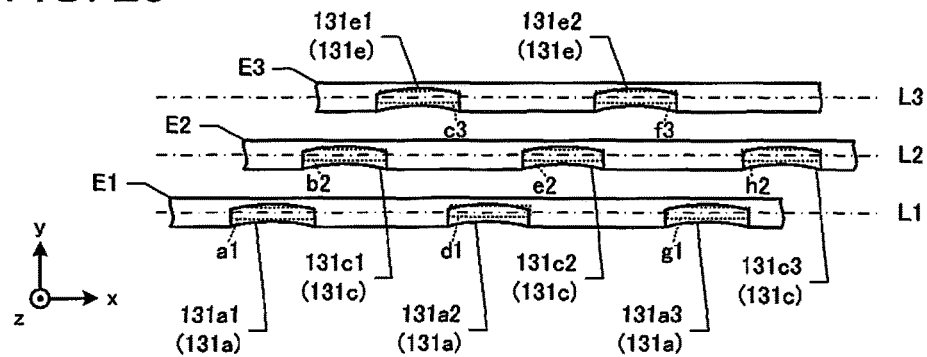
FIG. 23 schematically illustrates the segments of the scan line and the corresponding mirrors.

For example, the foregoing embodiments have line sensors in an even-number of rows, but there may be an odd number of line sensors. FIG. 21 to FIG. 23 show an example of a configuration of line sensors and optical members in three rows. The light path is indicated by the double-dot dash line in FIG. 21. In FIG. 22 and FIG. 23, the scan lines L1, L2, L3 are indicated by the dot-dash line, and the segments are indicated by the dotted lines. The double-dot dash line in FIG. 22 indicates where the end of one segment overlaps the end of another segment and a position in the main scanning direction.

This example is a configuration that magnifies and reads segments of scan lines L1, L2, L3 respectively illuminated by light sources 10a, 10b, 10c.

The image of segment a1 of the scan line L1 is magnified by mirror 131a1 (mirror 131a), which is a concave mirror, reflected by mirror 131b, which is a plane mirrors, and imaged by line sensor 1411a associated with the first row. Segment b2 of the scan line L2, and segment c3 of the scan line L3, are likewise magnified and guided by corresponding optical members, and imaged by line sensor 1421a on the second row and line sensor 1431a on the third row.

In this way, images of segments of three different scan lines L1, L2, L3 are magnified and imaged by line sensors in corresponding rows, and scanned image data can be generated by combining (synthesizing) the images captured by each line sensor. Note that because the optical member E1 including the mirrors 131a1, 131a2, 131a3, the optical member E2 including the mirrors 131c1, 131c2, 131c3, and the optical member E3 including the mirrors 131e1, 131e2, have the same construction and are therefore interchangeable. This configuration, however, has more light sources than configurations having line sensors in four rows as in the first to third embodiments.

Figure 24:
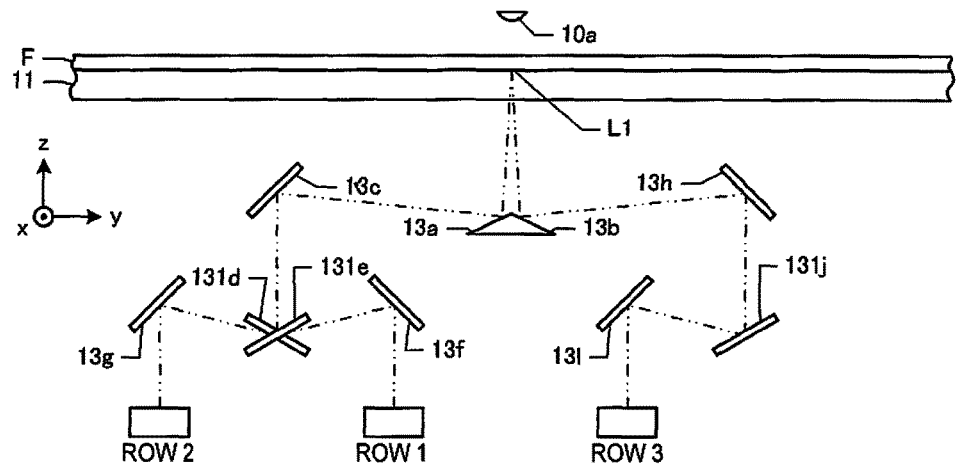
FIG. 24 schematically illustrates the configuration of optical members and a line sensor.
Figure 25:
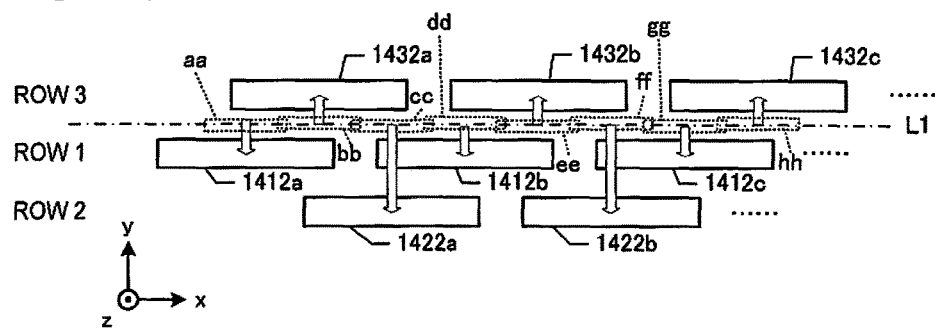
FIG. 25 schematically illustrates segments of a scan line and the corresponding line sensors.
Figure 26:
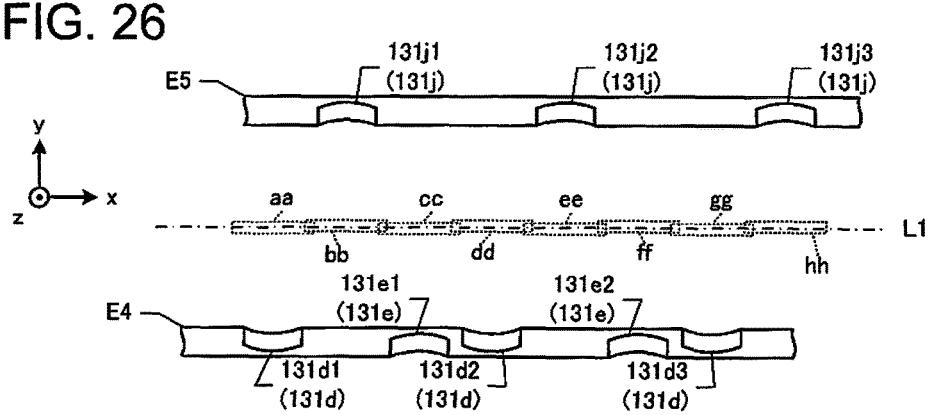
FIG. 26 schematically illustrates the segment of the scan line and the corresponding mirrors.

FIG. 24 to FIG. 26 show an example of a configuration of line sensors and optical members in a configuration having three rows. In FIG. 24 the light path is indicated by the double-dot dash line. In FIG. 25 and FIG. 26, the scan line L1 is indicated by the dot-dash line, and the segments are indicated by the dotted lines. Like parts in this example and the first embodiment are identified by like reference numerals and further description thereof is omitted.

The image of segment aa of the scan line L1 is reflected by mirror 13*a* and mirror 13*c*, magnified by concave mirror 131*d*1 (mirror 131*d*), reflected by mirror 13*f*, and imaged by the line sensor 1412*a* of the first row. The image of segment bb of the scan line L1 is reflected by mirror 13*b* and mirror 13*h*, magnified by mirror 131*j*1, reflected by mirror 13*l*, and imaged by the line sensor 1432*a* of the third row. The image of segment cc of the scan line L1 is reflected by the mirror 13*a* and the mirror 13*c*, magnified by mirror 131*e*1, reflected by mirror 13*g*, and imaged by the line sensor 1422*a* of the second row. The image of segment dd is magnified and imaged by the line sensor 1412*b* of the first row in the same way as the segment aa. The image of segment ee is magnified and imaged by the line sensor 1432*b* of the third row in the same way as the segment bb. The image of segment ff is magnified and imaged by the line sensor 1422*b* of the second row in the same way as the segment cc.

In this way, scanned image data can be generated by combining (synthesizing) the images captured by line sensors in three rows. In this configuration, the number of light sources is the same as in the first and second embodiments, but because the optical member E4 including the mirrors 131*d*1, 131*e*1, 131*d*2, 131*e*2, 131*d*3, and optical member E5 including the mirrors 131*j*1, 131*j*2, 131*j*3, are configured differently, they cannot be used interchangeably.

As described above, while the line sensors may be configured in an odd number of rows, the number of rows L of line sensors is preferably the smallest possible integer that is greater than or equal to magnification n because of the ease of reducing the cost of development.

The photoelectric conversion elements are also not limited to being disposed to a single sensor chip. The photoelectric conversion elements may be configured in multiple rows, or form an area sensor. The photoelectric conversion elements may also all be the same, or may be photoelectric conversion elements corresponding to different colors by providing color filters, for example. For example, there may be three rows of photoelectric conversion elements, including a row of R photoelectric conversion elements, a row of G photoelectric conversion elements, and a row of B photoelectric conversion elements.

Furthermore, the embodiments described above use multiple sensor chips, but a single large area sensor chip may be used instead. In this case, photoelectric conversion elements positioned between multiple sensor chips are not used, and images may be generated from the output of a photoelectric conversion element group of an area sensor chip disposed to the position corresponding to each sensor group of multiple sensor chips.

Lenses may be used as the optical members, but mirrors are preferable as a means of reducing the effect of chromatic aberrations resulting from using lenses.

The scanned image data representing a document F may also be output to and printed by a printer, or output and displayed on a monitor.

According to one aspect of the embodiment, a scanner achieving the objective is a scanner that reads a document using a line sensor, and has an optical member that, when the scanning resolution in the main scanning direction is D, and the resolution of the line sensor is S, causes the line sensor to image light from a document magnified at a magnification n (where n is greater than or equal to D/S and is greater than 1). The multiple line sensors are arrayed in L rows (where L is greater than or equal to n and is an integer of 3 or more) in the sub-scanning direction, each line sensor reads a magnified image of magnification ratio n of each corresponding position in the main scanning direction of the document guided by the optical members.

Note that it is sufficient for the line sensors to be able to read a magnified image of magnification ratio n of the corresponding position in the main scanning direction of the document, and positions partially overlapping the positions read by other line sensors may also be read.

This configuration enables scanning at a higher resolution in the main scanning direction than the resolution of the line sensor. More specifically, each line sensor reads a magnified image of different positions of the document in the main scanning direction, and can acquire scanned image data of the document of a scanning resolution D in the main scanning direction by stitching together (synthesizing) image data read by the individual line sensors. If the line sensor is arrayed in one row, the size in the main scanning direction of the area where the line sensor is disposed increases as n increases, but because line sensors in this embodiment of the invention are disposed in L rows, scanning with a high resolution in the main scanning direction is possible without increasing according to the magnification ratio the size in the main scanning direction of the area where the line sensor is disposed.

Other objects and attainments together with a fuller understanding of the invention will become apparent and appreciated by referring to the above description and claims taken in conjunction with the accompanying drawings.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A scanner that reads a document using a sensor group, the scanner comprising:
    an optical member including a plurality of mirrors or a plurality of lens, when a scanning resolution in a main scanning direction is D, and a resolution of the sensor group is S, the optical member causing the sensor group to image light from the document magnified by a magnification ratio n, where n is greater than or equal to D/S and is greater than 1,
    the sensor group including a plurality of sensor portions that are arrayed in L rows in a sub-scanning direction, L being greater than or equal to n that is an integer, each of the sensor portions reading a magnified image that is magnified by the magnification ratio n at each corresponding position in the main scanning direction of the document and that is guided by the mirror or lens, the plurality of mirrors or the plurality of lens including
a first element guiding light from a first segment of the document to a first sensor portion in a first row among the sensor portions,
a second element guiding light from a second segment of the document, which is separated in the main scanning direction from the first segment, to a second sensor portion in a second row among the sensor portions, and
a third element guiding light from a third segment of the document between the first segment and the second segment to a third sensor portion in a third row among the sensor portions, and
the first element and the second element being disposed without the third element being sandwiched therebetween.

2. A scanner that reads a document using a sensor group, the scanner comprising:
an optical member including a plurality of mirrors or a plurality lens, when a scanning resolution in a main scanning direction is D, and a resolution of the sensor group is S, the optical member causing the sensor group to image light from the document magnified by a magnification ratio n, where n is greater than or equal to D/S and is greater than 1,
the sensor group including a plurality of sensor portions that are arrayed in L rows in a sub-scanning direction, L being greater than or equal to n that is an integer, each of the sensor portions reading a magnified image that is magnified by the magnification ratio n at each corresponding position in the main scanning direction of the document and that is guided by the mirror or lens,
the plurality of mirrors or the plurality of lens including
a first element guiding light from a first segment of the document to a first sensor portion in a first row among the sensor portions,
a second element guiding light from a second segment of the document, which is separated in the main scanning direction from the first segment, to a second sensor portion in a second row among the sensor portions, and
a third element guiding light from a third segment of the document between the first segment and the second segment to a third sensor portion in a third row among the sensor portions, and
the first sensor portion and the second sensor portion being disposed without the third sensor portion being sandwiched therebetween.

3. The scanner according to claim 1, wherein L is an even number.

4. An image data generating method of a scanner having an optical member that includes a plurality of mirrors or a plurality of lens and, when a scanning resolution in a main scanning direction is D, and a resolution of a sensor group is S, magnifies light from a document by a magnification ratio n and causes the sensor group to image a magnified light, n being greater than or equal to D/S and being greater than 1, the sensor group including a plurality of sensor portions that are arrayed in L rows in a sub-scanning direction, L being greater than or equal to n that is an integer, each of the sensor portions reading a magnified image that is magnified by the magnification ratio n at each corresponding position in the main scanning direction of the document and is guided by the optical member, the image data generating method comprising:
generating image data of the document at the scanning resolution D in the main scanning direction by combining image data read by the sensor portions that are arranged in the rows, respectively,
the plurality of mirrors or the plurality of lens including
a first element guiding light from a first segment of the document to a first sensor portion in a first row among the sensor portions,
a second element guiding light from a second segment of the document, which is separated in the main scanning direction from the first segment, to a second sensor portion in a second row among the sensor portions, and
a third element guiding light from a third segment of the document between the first segment and the second segment to a third sensor portion in a third row among the sensor portions, and
the first element and the second element being disposed without the third element being sandwiched therebetween.

5. An image data generating method of a scanner having an optical member that includes a plurality of mirrors or a plurality of lens and, when a scanning resolution in a main scanning direction is D, and a resolution of a sensor group is S, magnifies light from a document by a magnification ratio n and causes the sensor group to image a magnified light, n being greater than or equal to D/S and being greater than 1, the sensor group including a plurality of sensor portions that are arrayed in L rows in a sub-scanning direction, L being greater than or equal to n that is an integer, each of the sensor portions reading a magnified image that is magnified by the magnification ratio n at each corresponding position in the main scanning direction of the document and is guided by the optical member, the image data generating method comprising:
generating image data of the document at the scanning resolution D in the main scanning direction by combining image data read by the sensor portions that are arranged in the rows, respectively,
the plurality of mirrors or the plurality of lens including
a first element guiding light from a first segment of the document to a first sensor portion in a first row among the sensor portions,
a second element guiding light from a second segment of the document, which is separated in the main scanning direction from the first segment, to a second sensor portion in a second row among the sensor portions, and
a third element guiding light from a third segment of the document between the first segment and the second segment to a third sensor portion in a third row among the sensor portions, and
the first sensor portion and the second sensor portion being disposed without the third sensor portion being sandwiched therebetween.

* * * * *